(No Model.) 2 Sheets—Sheet 1.
P. F. RICKER & A. PLACK.
CORN HARVESTER.
No. 578,657. Patented Mar. 9, 1897.
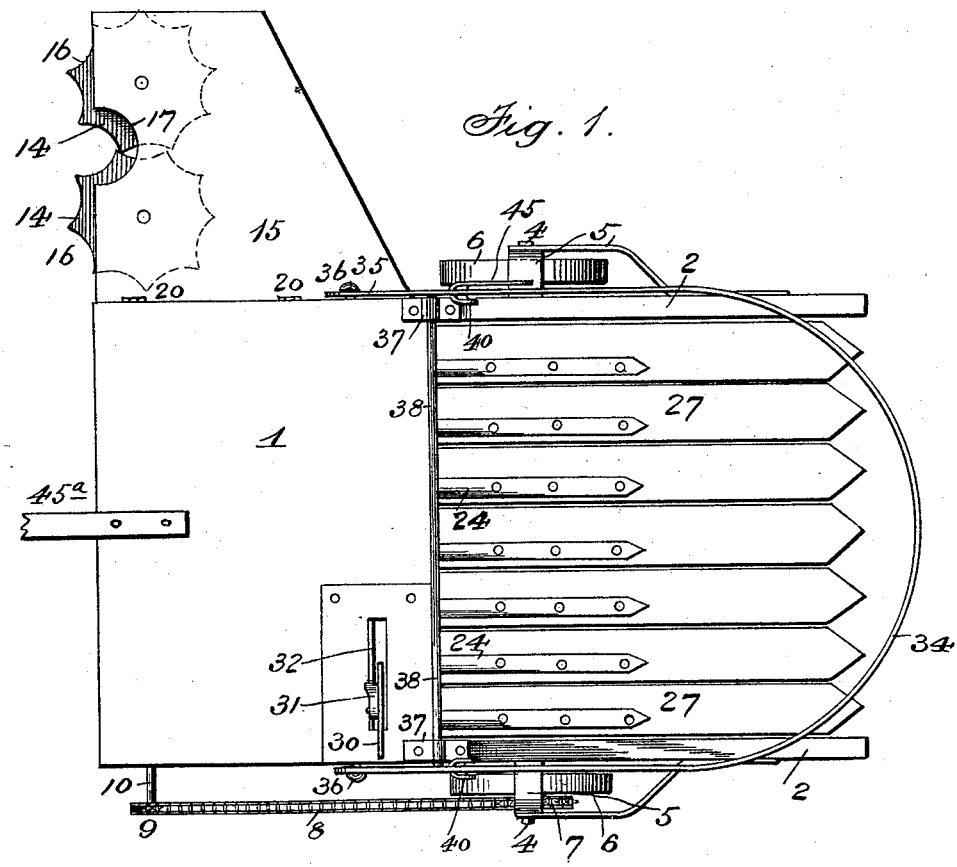

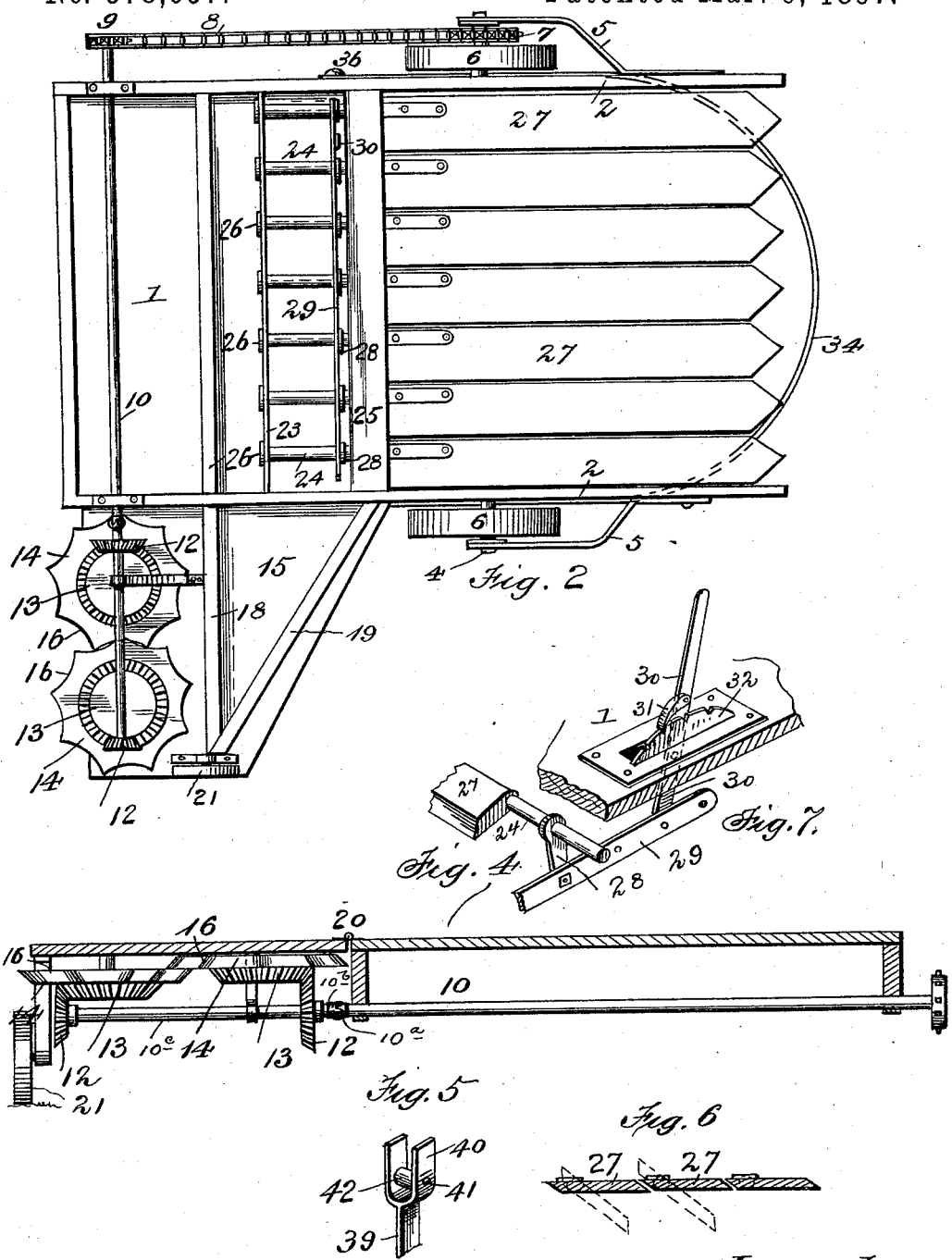

UNITED STATES PATENT OFFICE.

PETER FRANCE RICKER AND ANDREW PLACK, OF GALION, OHIO.

CORN-HARVESTER.

SPECIFICATION forming part of Letters Patent No. 578,657, dated March 9, 1897.

Application filed March 19, 1896. Serial No. 583,945. (No model.)

*To all whom it may concern:*

Be it known that we, PETER FRANCE RICKER and ANDREW PLACK, citizens of the United States, and residents of Galion, in the county of Crawford and State of Ohio, have invented certain new and useful Improvements in Corn-Harvesters; and we do hereby declare that the following is a full, clear, and exact description of the invention, which will enable others skilled in the art to which it appertains to make and use the same, reference being had to the accompanying drawings, which form a part of this specification.

Our invention relates to harvesters of that class or description in which the standing corn is cut by rotating blades or cutters located at one side of the machine and the cut stalks held on a slatted platform by a movable yoke until a sufficient quantity has accumulated, when the yoke is operated and the slats of the platform tilted so that the stalks will be dumped or fall onto the ground in an upright position.

The object of the invention is to provide improved cutters and means for operating the same, and an improved holding-platform and yoke and mechanism for operating the same, whereby we secure important advantages with respect to efficiency in operation.
The invention consists in the novel construction and combination of parts hereinafter fully described and claimed.

Figure 1 is a plan view of a corn-harvester constructed in accordance with our invention.
Fig. 2 is a bottom view. Fig. 3 is a central longitudinal section of the same. Fig. 4 is a transverse sectional view on the line $xx$, Fig. 3. Fig. 5 is a detail perspective view of one of the brackets which support the yoke. Fig.
40 6 is a detail cross-section of the tilting platform. Fig. 7 is a detail perspective view showing the means for feathering or turning the pivoted slats.

In the said drawings the reference-numeral
45 1 designates the main platform of the machine, the side bars 2 of which extend some distance rearwardly, and intermediate the ends each is provided with a stud-shaft or axle 4, the outer ends of which are supported by brackets 5. On these shafts or axles are journaled the supporting-wheels 6, to one of which is secured a sprocket-wheel 7, connected by a sprocket-chain 8 with a sprocket-pinion 9 on one end of a transverse shaft 10, journaled in the side bars 2, near the front end of the platform 1.

The inner end of this shaft 10 is provided with a knuckle $10^a$, which engages with a corresponding knuckle $10^b$ on the inner end of a shaft $10^c$, which is located under the front of the machine and is provided with two pinions 12, which mesh with cog-wheels 13, secured to rotatable cutters 14, journaled to the under side of a hinged and swinging platform 15. The said cutters or blades are polygonal-shaped, having a number of overlapping concave sides 16, and just in rear of the meeting points of said sides the platform 15 is formed with a semicircular guide-recess 17. The said platform 15 is approximately triangular-shaped, and its front end when it is let down is supported by a transverse bar 18 and an inclined brace-bar 19.

The platform is hinged to the side bars of the machine at 20, and at its outer sides is provided with a supporting-wheel 21, which runs along the ground when the machine is in use. The said platform may be elevated by turning on its hinges, the knuckles $10^a$ and $10^b$ separating for this purpose, as they are not secured to each other.

Journaled to a transverse bar 23, secured to the sides of the machine, are a number of rearwardly-extending rods 24, which also pass through another transverse bar 25. The front ends of these rods are provided with collars 26, while their rear ends are secured to flat bars 27, having their side edges beveled, as seen in Fig. 4. These bars constitute the platform for holding the cut stalks. Secured to the rods 24 are downwardly-depending cranks 28, the ends of which are pivoted to a transverse bar 29, with which is pivotally connected a lever 30, which extends up through the platform 1 and is provided with a pawl 31, adapted to engage with a segment-rack 32 to hold it in position.

Pivoted to the sides of the machine, near the rear end of the platform 1, is a yoke 34, consisting of a metal rod bent into an approximately semicircular form, the ends of which are inclined downwardly and bent into eyes or loops 35, which engage with pivots or pins 36, by which the yoke is pivotally connected with the machine.

Journaled in bearings 37 at the rear of platform 1 is a transverse shaft 38, provided at the ends with arms 39. These arms are provided with brackets 40, pins 41, and rollers 42, which latter support the yoke. One of said arms is extended upwardly, forming a handle 45, by actuating which the yoke can be elevated and lowered.

The numeral 45ª designates the tongue or pole of the machine.

The operation is as follows: When in use, the side platform is lowered so that the supporting-wheel thereof will rest on the ground, and the slats or bars of the rear platform are turned so as to present their flat sides uppermost, and the beveled edges of one slat resting upon the oppositely-beveled edge of the adjoining slat or bar. The said slats or bars are held in position by the lever 30 and the pawl and segment-rack. As the machine is drawn across the field the concave edges of the overlapping rotating cutters will engage with the cornstalks, severing or cutting the same. As the stalks are thus cut they are grasped by a person on the cutter-platform and deposited in an upright position on the rear platform, their butts or lower ends resting on the slats thereof and held in such position by the yoke or bail. When a sufficient quantity has accumulated on said slats, the bail is elevated or swung upward by the handle 45, thereby releasing the stalks, and at the same time the slats are feathered or turned edgewise by means of the lever 30, the bar pivoted thereto and connections allowing the stalks to fall down or be deposited on the ground in an upright position, the slats sliding out from between the same as the machine continues its travel.

Having thus fully described our invention, what we claim is—

1. In a corn-harvester, the combination with the hinged tilting platform, the shaft journaled thereto, provided at the outer end with a sprocket-wheel and at the inner end with a knuckle, of the shaft having a corresponding knuckle engaging therewith, the beveled pinions, the beveled pinions engaging therewith, and the rotatable overlapping polygonal disks; substantially as described.

2. In a corn-harvester of the character described, the combination with the flat oscillating bars having beveled edges, the rods secured to the front ends thereof, and means for operating the same, of the pivoted yoke, comprising the metal rod bent into semicircular form and the ends inclined downwardly and formed into eyes pivotally connected with the machine, the transverse shaft located in rear of the pivotal points of said yoke, the arms secured to each end of said shaft, the brackets at the upper ends thereof, the pins, the rollers engaging with the horizontal portion of the yoke to hold it in operative position and adapted to engage with the inclined ends of the yoke to elevate the same, and the handle secured to one of said arms, substantially as described.

In testimony that we claim the foregoing as our own we have hereunto affixed our signatures in presence of two witnesses.

PETER FRANCE RICKER.
ANDREW PLACK.

Witnesses:
J. H. SHELLEY,
C. R. MILLER.